(12) United States Patent
Lessmann et al.

(10) Patent No.: US 10,673,769 B2
(45) Date of Patent: Jun. 2, 2020

(54) ANALYSIS DEVICE FOR THE ANALYSIS AND MANIPULATION OF A COMMUNICATION SEQUENCE

(71) Applicant: Phoenix Contact GmbH & Co. KG, Blomberg (DE)

(72) Inventors: Gunnar Lessmann, Nieheim (DE); Tim Russ, Magdeburg (DE); Jan Krause, Magdeburg (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 0 days.

(21) Appl. No.: 15/527,671

(22) PCT Filed: Nov. 13, 2015

(86) PCT No.: PCT/EP2015/076602
§ 371 (c)(1),
(2) Date: Oct. 16, 2017

(87) PCT Pub. No.: WO2016/079027
PCT Pub. Date: May 26, 2016

(65) Prior Publication Data
US 2018/0115492 A1    Apr. 26, 2018

(30) Foreign Application Priority Data
Nov. 18, 2014   (DE) .................. 10 2014 116 865

(51) Int. Cl.
*H04L 12/801*    (2013.01)
*H04L 12/26*    (2006.01)

(52) U.S. Cl.
CPC .............. *H04L 47/34* (2013.01); *H04L 43/18* (2013.01); *H04L 43/50* (2013.01)

(58) Field of Classification Search
None
See application file for complete search history.

(56) References Cited

U.S. PATENT DOCUMENTS 5,291,591 A * 3/1994 Kawano ................. G06F 8/71
                                                   707/999.202
6,011,830 A * 1/2000 Sasin ..................... H04M 3/323
                                                      379/10.03

(Continued)

FOREIGN PATENT DOCUMENTS

| CN | 101860460 A | 10/2010 |
|----|-------------|---------|
| DE | 44 47 218 A1 | 1/1996 |
| DE | 10 2006 047762 A1 | 4/2008 |

OTHER PUBLICATIONS

Chen et al., "Conformance Testing of Network Simulators Based on Metamorphic Testing Technique", Centre for Software Analysis and Testing, Swinburne University of Technology, D. Lee et al (Eds.): FMOODS/FORTE 2009, LNCS 5522, pp. 243-248, 2009, © IFIP International Federation for Information Processing 2009.

(Continued)

*Primary Examiner* — Joseph A Bednash
(74) *Attorney, Agent, or Firm* — Holland & Hart LLP

(57) ABSTRACT

The present disclosure relates to an analysis device configured to analyze a communication sequence. The analysis device includes a memory configured to store a desired communication sequence and a processor. The processor is configured to read out the desired communication sequence from the memory, create a Petri net as a function of the read-out desired communication sequence, compare the communication sequence to the created Petri net, and analyze the communication sequence.

16 Claims, 14 Drawing Sheets

(56) References Cited

U.S. PATENT DOCUMENTS

| | | | | |
|---|---|---|---|---|
| 6,654,911 | B1* | 11/2003 | Miles | G06F 11/3664 |
| | | | | 714/25 |
| 2002/0062432 | A1* | 5/2002 | Bouraoui | G06F 11/3471 |
| | | | | 711/203 |
| 2007/0033441 | A1* | 2/2007 | Sathe | G06F 11/36 |
| | | | | 714/38.14 |
| 2008/0320437 | A1 | 12/2008 | Maennel | |
| 2009/0138258 | A1* | 5/2009 | Neale | G06F 17/248 |
| | | | | 704/9 |
| 2013/0198397 | A1* | 8/2013 | Zhang | H04W 4/02 |
| | | | | 709/228 |

OTHER PUBLICATIONS

Li Weihai et al., "Vulnerability testinh of WAP based on extended syntax analysis", Broadband Network & Multimedia Technology, 2009, IC-BNMT '09. 2nd IEEE International Conference on, IEEE, Piscataway, NJ, USA, Oct. 18, 2009 (Oct. 18, 2009), pp. 777-780, XP031576195, ISBN: 978-1-4244-4590-5.

Diaz et al., "Observer—A Concept for Formal On-Line Validation of Distributed Systems", IEEE Transactions on Software Engineering, IEEE Service Center, Los Alamitos, CA, US, vol. 20, No. 12, Dec. 31, 1994 (Dec. 31, 1994), pp. 900-913, XP000483036, ISSN: 0098-5589, DOI: 10.1109/32.368136.

\* cited by examiner

ANALYSIS DEVICE FOR THE ANALYSIS AND MANIPULATION OF A COMMUNICATION SEQUENCE

CROSS-REFERENCE TO RELATED APPLICATIONS

This application is a 371 national phase filing of International Application No. PCT/EP2015/076602, entitled "ANALYSIS DEVICE FOR THE ANALYSIS AND MANIPULATION OF A COMMUNICATION SEQUENCE", filed 13 Nov. 2015, which claims priority to German Patent Application No. 10 2014 116 865.8, entitled "ANALYSEVORRICHTUNG ZUR ANALYSE UND MANIPULATION EINER KOMMUNIKATIONSSEQUENZ", filed 18 Nov. 2014.

BACKGROUND

The present disclosure relates to an analysis device for the analysis and manipulation of a communication sequence.

To analyze communication between communication nodes in a communications network, data packets frequently exchanged between the communication nodes which can form a communication sequence are recorded and checked manually. For example, a computer connected between two communication nodes will record data packets exchanged between the communication nodes and a user of the computer will check the recorded data packets for communication errors.

Particularly in real-time-capable communications networks such as real-time-capable Ethernet communications networks, a plurality of data packets is frequently exchanged between a further plurality of communication nodes within a short period of time. Manual checking of the recorded data packets can thereby be considered time-consuming as well as inconvenient.

Furthermore, when searching for highly sporadic errors, the data packets frequently exchanged between the communication nodes are recorded over a long period of time and manually checked. This can result in a large volume of data needing to be stored, whereby such an analysis can be further cost-intensive.

SUMMARY

The task on which the disclosure is based is that of specifying an efficient concept for the analysis of a communication sequence.

The subject matter solves this task by the features of the independent claims. Advantageous examples of the disclosure constitute the subject matter of the figures, the description and the dependent claims.

According to a first aspect of the disclosure, the task is solved by an analysis device for the analysis of a communication sequence comprising: a memory, in which a desired communication sequence is stored; and a processor, which is configured to read out the desired communication sequence from the memory, create a Petri net as a function of the read-out desired communication sequence and compare the communication sequence to the created Petri net in order to analyze the communication sequence. This thereby achieves the advantage of enabling automatic checking of the communication sequence. Moreover, this check can be performed at high processing speed.

The analysis device can be a computer, a laptop, a smartphone or a tablet. The analysis device can furthermore be integrated in a field device or a control device such as a controller. The processor can be a central processing unit (CPU) of the analysis device.

The communication sequence can comprise data packets exchanged between communication nodes such as computers, field devices or control devices in a communications network, whereby the data packets can comprise messages exchanged between the communication nodes. For example, the data packets are captured by a network tap and fed to the analysis device. The analysis device can further comprise a communication interface such as an Ethernet interface for capturing data packets and/or receiving captured data packets, particularly by means of a network tap or by means of a switch with mirroring port. The analysis device can further comprise a memory interface such as a Universal Serial Bus (USB) interface for connecting a further memory such as a USB memory or USB stick on which the communication sequence is stored and from which the communication sequence can be copied into the memory.

The communications network can be a process field network (PROFINET), an Industrial Ethernet network, an Ethernet network, particularly a real-time-capable Ethernet network, a local area network (LAN), a wireless local area network (WLAN), the internet or a telephone network.

The memory can comprise a random access memory (RAM) memory element, a hard disk drive (HDD) memory element such as a hard disk, a flash memory element such as a solid-state drive (SSD) and/or an electrically erasable programmable read-only memory (EEPROM) memory element.

The desired communication sequence can be prestored in the memory in the form of a textual description. The textual description can comprise expected messages exchanged between the communication nodes listed one below or one after another. The textual description can further comprise fragments such as loops or alternatives, whereby the desired communication sequence can describe a dynamic communication sequence.

The processor can furthermore be configured to transform the communication sequence and/or the desired communication sequence into an internal sequence model, e.g., in the form of a sequence diagram, in particular by means of a library prestored in the memory. Individual messages and/or fragments can thereby be linked together sequentially. The sequence diagram can be a diagram according to the Unified Modeling Language (UML) sequence diagram (SD) standard, a diagram according to the ITU-T MSC standard of the International Telecommunication Union or a diagram derived from these two cited standards. According to one example, the desired communication sequence can have been prestored in the memory as a sequence model, e.g., as a sequence diagram.

To create the Petri net as a function of the read-out desired communication sequence, the sequence diagram can be transformed into a Petri net in such a manner that valid messages in the communications network to be analyzed are modeled by firing-capable transitions. At least one trigger event can thereby be assigned to each transition. Furthermore, a list of the messages relevant to analyzing the communication sequence can be compiled. An introduction to Petri nets is provided for example in Priese, L; Wimmel, H.: "Petri Netze", 2nd Ed., Springer, Berlin, 2008.

To compare the communication sequence to the created Petri net, a conformity check can be conducted. Here, a data packet contained in the communication sequence can be decoded and compared to the list of relevant data packets. If the decoded data packet is contained in the list of relevant data packets, the created Petri net can then be searched for a transition associated with the decoded data packet. If the transition can fire, the message contained in the decoded message packet can then be valid. If the transition cannot fire, the message contained in the decoded message packet can then be invalid. The conformity check can be run on all the data packets contained in the communication sequence.

According to one example, the analysis device can comprise a display element such as a liquid crystal display (LCD) indicator, by means of which the desired communication sequence and/or the communication sequence can be displayed graphically, in particular in the form of a sequence diagram. Furthermore, differences between the desired communication sequence and the communication sequence can be displayed in textual or graphical form via the display element.

In one advantageous example of the analysis device, the processor is configured to check the communication sequence for conformity to the established desired behavior (in the form of a Petri net) in order to compare the communication sequence to the created Petri net. This thereby achieves the advantage of being able to efficiently identify a communication error in the communication sequence.

In a further advantageous example of the analysis device, the desired communication sequence is stored in the memory in the form of a textual sequence or in the form of a sequence diagram. This thereby achieves the advantage of efficiently creating the Petri net.

In a further advantageous example of the analysis device, the analysis device is configured with an editor for creating the desired communication sequence. This thereby achieves the advantage of a user of the analysis device being able to create the desired communication sequence.

The editor can be made available by a graphical computer program which provides a user interface for creating the desired communication sequence. The analysis device can further comprise a display element such as an LCD indicator for graphically displaying the user interface and/or a control element such as a keyboard and/or mouse for using the user interface.

In a further advantageous example of the analysis device, the processor is further configured to generate an analysis report based on the comparing of the communication sequence to the created Petri net. This thereby achieves the advantage of being able to store a result of the comparison of the communication sequence to the created Petri net.

The analysis report can contain a result of the comparison of the communication sequence to the created Petri net. For example, the analysis report records events which have occurred and/or conformities and discrepancies between the communication sequence and the created Petri net. The analysis report can furthermore be generated in the form of a text file such as a text log or in the form of sequence diagram.

In a further advantageous example of the analysis device, the analysis device is configured with a display element for graphically displaying the generated analysis report. This thereby achieves the advantage of being able to display a result of the comparing of the communication sequence to the created Petri net.

The display element can be an LCD display or a cathode ray tube screen. The analysis report can furthermore be displayed as text or as a graphical sequence diagram.

In a further advantageous example of the analysis device, the communication sequence is stored in the memory and the processor is configured to read out the communication sequence from the memory. This thereby achieves the advantage of being able to analyze a recorded communication sequence.

The communication sequence can for example be in the form of a packet capture file (PCAP) stored in the memory. For example, the PCAP file is recorded by a computer and an analysis software such as Wireshark or Tcpdump and copied into the memory of the analysis device. An offline mode is thereby provided for analyzing the communication sequence.

In a further advantageous example of the analysis device, the analysis device is configured with a communication interface configured to capture transmitted data packets in a communications network in order to obtain the communication sequence. This thereby achieves the advantage of being able to analyze ongoing communication.

The communication interface can comprise an Ethernet interface, a LAN interface and/or a WLAN interface. The communication interface can further comprise a plurality of interfaces, in particular Ethernet interfaces. Said plurality amounts for example to 2, 3, 4, 5, 6, 7, 8, 9 or 10.

The communications network can be a process field network (PROFINET), an Industrial Ethernet network, an Ethernet network, particularly a real-time-capable Ethernet network, a local area network (LAN), a wireless local area network (WLAN), the internet or a telephone network.

In a further advantageous example of the analysis device, the communication interface comprises at least one Ethernet interface. This thereby achieves the advantage of being able to capture a communication sequence in an Ethernet communications network, particularly a PROFINET communications network.

In a further advantageous example of the analysis device, the communication interface comprises two Ethernet interfaces. This thereby achieves the advantage of being able to connect the analysis device between two communication nodes in order to capture all the data packets exchanged between the two communication nodes.

In a further advantageous example of the analysis device, a modification rule is further stored in the memory and the processor is further configured to read out the modification rule from the memory and modify a data packet captured by the communication interface as a function of the read-out modification rule so as to obtain a modified communication sequence. This thereby achieves the advantage of being able to analyze a communication node's reaction to a modified communication.

The modification rule can be stored in the memory in the form of a textual sequence or in the form of a sequence diagram. Furthermore, the processor can be configured to decode the captured data packet in order to obtain a decoded message. The processor can further be configured to modify one or more parameters of the decoded message in accordance with the modification rule. The processor can furthermore be configured to delete the captured data packet. It is thus not forwarded to the actual receiver. This likewise modifies the communication as a function of the read-out modification rule.

According to one example, the processor can be configured to decode the captured data packet, convert a result of the decoding into an event, and check whether the result can be assigned to a transition in the Petri net in order to modify the captured data packet.

According to a further example, the analysis device can be further configured to output a data packet captured by the communication interface after a time delay or do so multiple times, in particular twice, so as to obtain a modified communication sequence.

In a further advantageous example of the analysis device, the communication interface is configured to output the modified data packet. This thereby achieves the advantage of being able to transmit the modified data packet to the receiver instead of the original data packet. Doing so can achieve a manipulation of the communication between communication nodes in the communications network.

In a further advantageous example of the analysis device, the processor is further configured to compare the modified communication sequence to the created Petri net and generate a further analysis report based on the comparison of the modified communication sequence to the created Petri net. This thereby achieves the advantage of being able to store a result of the modified communication sequence/created Petri net comparison.

To compare the modified communication sequence to the created Petri net, the above-described conformity check can be conducted. Furthermore, the further analysis report can contain a result of the modified communication sequence/created Petri net comparison. For example, events which have occurred and/or conformities and discrepancies between the modified communication sequence and the created Petri net are logged in the analysis report. The analysis report can furthermore be generated in the form of a text file such as a text log or in the form of sequence diagram. According to one example, the analysis report and the further analysis report can be combined into one common analysis report.

In a further advantageous example of the analysis device, the analysis device is configured with a display element for graphically displaying the further generated analysis report. This thereby achieves the advantage of being able to display a result of the comparing of the modified communication sequence to the created Petri net.

The display element can be an LCD indicator. Furthermore, the further analysis report can be displayed in text form or as a graphical sequence diagram. According to one example, the combined analysis report can furthermore be displayed as text or as a graphical sequence diagram.

In a further advantageous example of the analysis device, the modification rule is stored in the memory in the form of a textual sequence or in the form of a sequence diagram. This thereby achieves the advantage of being able to efficiently integrate the modification rule into the Petri net.

In a further advantageous example of the analysis device, the analysis device is configured with an editor for creating the modification rule. This thereby achieves the advantage of a user of the analysis device being able to create the modification rule.

The editor can be made available by a graphical computer program which provides a user interface for creating the modification rule and/or a selection rule for selecting a data packet to be modified. The analysis device can further comprise a display element such as an LCD indicator for graphically displaying the user interface and/or a control element such as a keyboard and/or mouse for using the user interface.

According to a second aspect of the disclosure, the task is solved by a method for analyzing a communication sequence which comprises: reading out a desired communication sequence from a memory; creating a Petri net as a function of the read-out desired communication sequence by means of a processor; and comparing the communication sequence to the created Petri net by means of the processor in order to analyze the communication sequence. This thereby achieves the advantage of enabling an automatic checking of the communication sequence.

The method can be realized by means of the above-described analysis device, by means of a computer, by means of a data processor, by means of a laptop, by means of a smartphone or by means of a tablet.

The communication sequence can comprise data packets exchanged between communication nodes such as computers, field devices or control devices in a communications network, whereby the data packets can comprise messages exchanged between the communication nodes. The data packets are for example captured by a network tap.

The communications network can be a process field network (PROFINET), an Industrial Ethernet network, an Ethernet network, particularly a real-time-capable Ethernet network, a local area network (LAN), a wireless local area network (WLAN), the internet or a telephone network.

The desired communication sequence can be prestored in the memory in the form of a textual description. The textual description can comprise expected messages exchanged between the communication nodes listed one below or one after another. The textual description can further comprise fragments such as loops or alternatives, whereby the desired communication sequence can describe a dynamic communication sequence.

The communication sequence and/or the desired communication sequence can be transformed, in particular by means of a definitions library prestored in the memory, into an internal sequence model such as a sequence diagram. Individual messages and/or fragments can thereby be linked together sequentially. The sequence diagram can be a diagram according to the Unified Modeling Language (UML) sequence diagram (SD) standard, a diagram according to the ITU-T Message Sequence Chart (MSC) standard of the International Telecommunication Union or a diagram derived from these two cited standards. According to one example, the desired communication sequence can have been prestored in the memory as a sequence diagram.

To create the Petri net as a function of the read-out desired communication sequence, the sequence diagram can be transformed into a Petri net in such a manner that valid messages in the communications network to be analyzed are modeled by firing-capable transitions. At least one trigger event can thereby be assigned to each transition. Furthermore, a list of the messages relevant to analyzing the communication sequence can be compiled.

To compare the communication sequence to the created Petri net, a conformity check can be conducted. Here, a data packet contained in the communication sequence can be decoded and compared to the list of relevant data packets. If the decoded data packet is contained in the list of relevant data packets, the created Petri net can then be searched for a transition associated with the decoded data packet. If the transition can fire, the message contained in the decoded message packet can then be valid. If the transition cannot fire, the message contained in the decoded message packet can then be invalid. The conformity check can be run on all the data packets contained in the communication sequence.

In one advantageous example of the method, the method further comprises the method step of: capturing transmitted data packets in a communications network via a communication interface in order to obtain the communication sequence. This thereby achieves the advantage of being able to analyze ongoing communication.

In a further advantageous example of the method, the method further comprises the method step of: reading out the modification rule from the memory; and modifying a data packet captured by the communication interface as a function of the read-out modification rule so as to obtain a modified communication sequence. This thereby achieves the advantage of being able to analyze a communication node's reaction to a communication error.

The modification rule can be stored in the memory in the form of a textual sequence or in the form of a sequence diagram. The captured data packet can furthermore be decoded in order to obtain a decoded message and one or more parameters of the decoded message modified in accordance with the modification rule. The captured data packet can furthermore be deleted in order to modify the captured data packet as a function of the read-out modification rule.

According to one example, the captured data packet can be decoded, a result of the decoding converted into an event, and checked as to whether the result can be assigned to a transition in the Petri net in order to modify the captured data packet.

In a further advantageous example of the method, the method further comprises the method step of: outputting the modified data packet via the communication interface. This thereby achieves the advantage of being able to transmit the modified data packet to a receiver instead of the original data packet. Doing so can achieve a manipulation of the communication between communication nodes in the communications network.

The disclosure can be implemented in hardware and/or software.

BRIEF DESCRIPTION OF THE DRAWINGS

Examples of the principles of this disclosure are depicted in the drawings and will be described in greater detail below.

DETAILED DESCRIPTION

Figure 1:
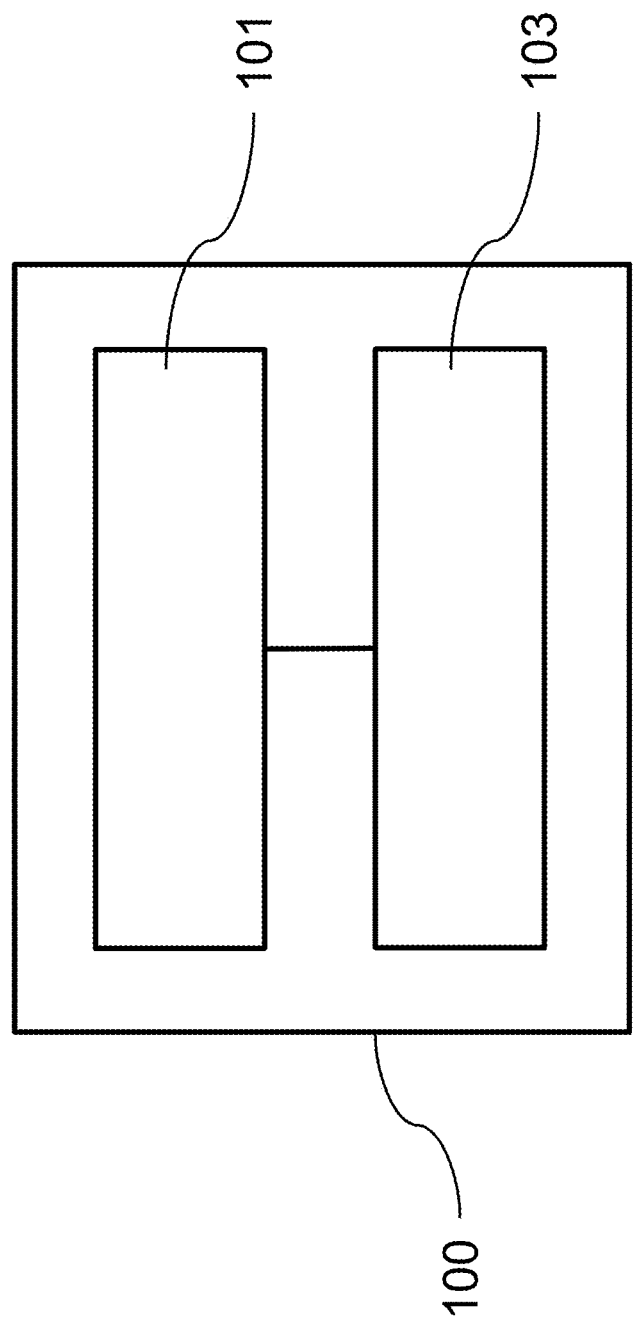
FIG. 1 is a schematic representation of an analysis device.

FIG. 1 shows a schematic representation of an analysis device 100. The analysis device 100 comprises a memory 101 and a processor 103 which are connected together.

The analysis device 100 for the analyzing of a communication sequence can be configured with: the memory 101, in which a desired communication sequence is stored; and the processor 103, which is configured to read out the desired communication sequence from the memory 101, create a Petri net as a function of the read-out desired communication sequence, and compare the communication sequence to the created Petri net in order to analyze the communication sequence.

The analysis device 100 can be a computer, a data processor, a laptop, a smartphone or a tablet. The analysis device 100 can furthermore be integrated in a field device or a control device such as a controller. The processor 103 can be a central processing unit (CPU) of the analysis device 100.

The communication sequence can comprise data packets exchanged between communication nodes such as computers, field devices or control devices in a communications network, whereby the data packets can comprise messages exchanged between the communication nodes. The data packets are for example captured by a network tap and fed to the analysis device 100. The analysis device 100 can further comprise a communication interface such as an Ethernet interface for capturing data packets and/or receiving captured data packets, particularly by means of a network tap or by means of a switch with mirroring port. The analysis device 100 can further comprise a memory interface such as a Universal Serial Bus (USB) interface for connecting a further memory such as a USB memory or USB stick on which the communication sequence is stored and from which the communication sequence can be copied into the memory 101.

The communications network can be a process field network (PROFINET), an Industrial Ethernet network, an Ethernet network, particularly a real-time-capable Ethernet network, a local area network (LAN), a wireless local area network (WLAN), the internet or a telephone network.

The memory 101 can comprise a random access memory (RAM) memory element, a hard disk drive (HDD) memory element such as a hard disk, a flash memory element such as a solid-state drive (SSD) and/or an electrically erasable programmable read-only memory (EEPROM) memory element.

The desired communication sequence can be prestored in the memory 101 in the form of a textual sequence. The textual sequence can comprise expected messages exchanged between the communication nodes listed one below or one after another. The textual description can further comprise fragments such as loops or alternatives, whereby the desired communication sequence can describe a dynamic communication sequence.

The processor 103 can furthermore be configured to transform the communication sequence and/or the desired communication sequence into an internal sequence diagram such as a sequence model, in particular by means of a library prestored in the memory 101. Individual messages and/or fragments can thereby be linked together sequentially. The sequence diagram can be a diagram according to the Unified Modeling Language (UML) sequence diagram (SD) standard, a diagram according to the ITU-T Message Sequence Chart (MSC) standard of the International Telecommunication Union or a diagram derived from these two cited standards. According to one example, the desired communication sequence can have been prestored in the memory 101 as a sequence diagram.

For creating the Petri net as a function of the read-out desired communication sequence, the sequence diagram can be transformed into a Petri net in such a manner that valid messages in the communications network to be analyzed are modeled by firing-capable transitions. At least one trigger event can thereby be assigned to each transition. Furthermore, a list of the messages relevant to analyzing the communication sequence can be compiled. Transforming sequence diagrams into Petri nets is described for example in the Ribeiro, Ó. R. and Fernandes, J. M. publication: "Some Rules to Transform Sequence Diagrams into Coloured Petri Nets," 7th Workshop and Tutorial on Practical Use of Coloured Petri Nets and the CPN Tools (CPN 2006), Aarhus, Denmark, October, 2006, the content of which is incorporated herein by reference.

For the comparison of the communication sequence to the created Petri net, a conformity check can be conducted. Here, a data packet contained in the communication sequence can be decoded and compared to the list of relevant data packets. If the decoded data packet is contained in the list of relevant data packets, the created Petri net can then be searched for a transition associated with the decoded data packet. If the transition can fire, the message contained in the decoded message packet can then be valid. If the transition cannot fire, the message contained in the decoded message packet can then be invalid. The conformity check can be run on all the data packets contained in the communication sequence.

According to one example, the analysis device 100 can comprise a display element such as a liquid crystal display (LCD) indicator, by means of which the desired communication sequence and/or the communication sequence can be displayed graphically, in particular in the form of a sequence diagram. Furthermore, differences between the desired communication sequence and the communication sequence can be displayed in textual or graphical form via the display element.

Furthermore, the analysis device 100 can form a programmable error generator and monitor for Ethernet-based systems (PROGES).

According to one example, a diagnosis of the communication sequence can furthermore be performed by means of the analysis device 100.

Figure 2:
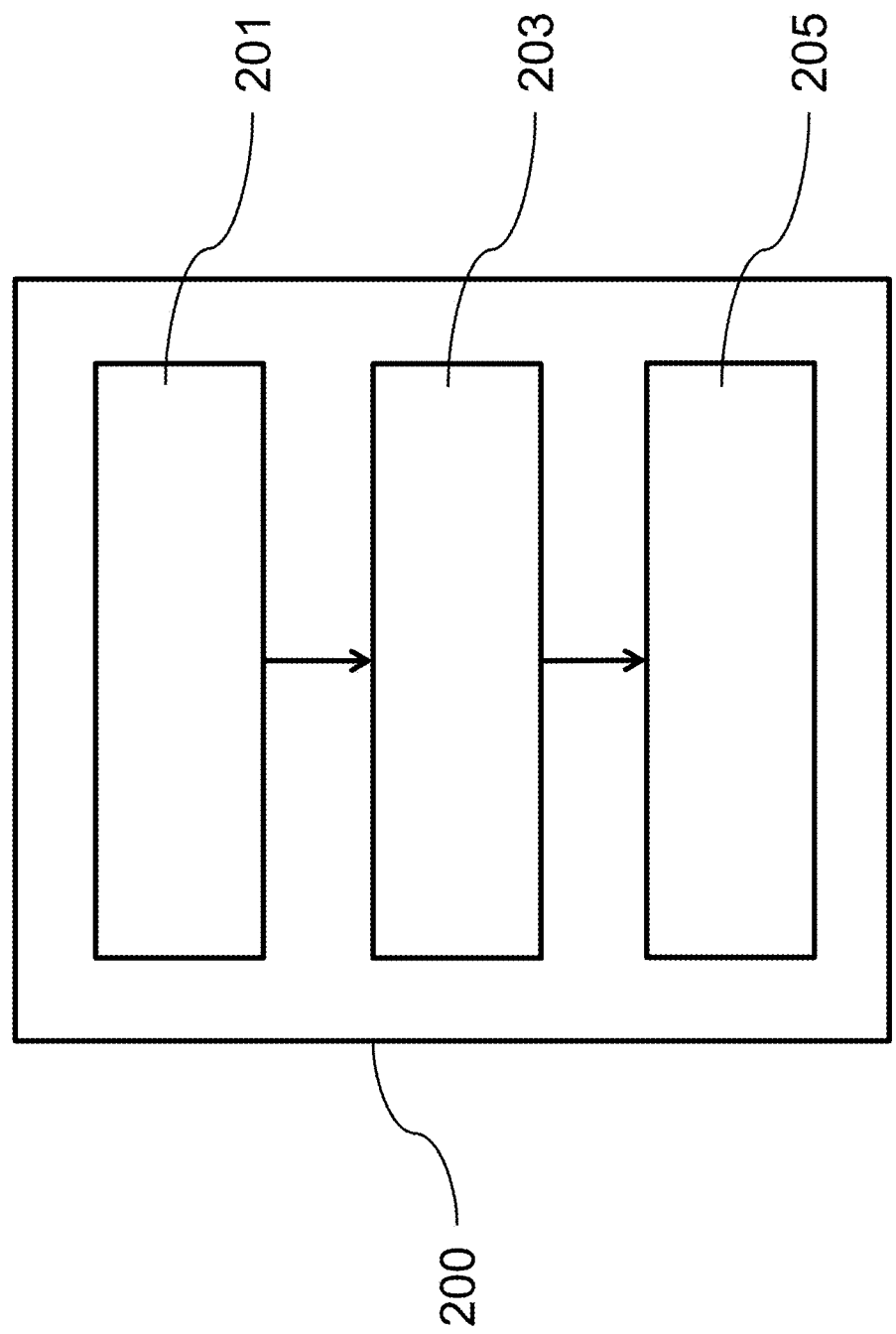
FIG. 2 is a schematic diagram of a method for the analysis of a communication sequence.

FIG. 2 shows a schematic diagram of a method 200 for analyzing a communication sequence. The method 200 comprises the method steps 201 to 205.

The method 200 for the analysis of a communication sequence comprises the method steps of: reading out 201 a desired communication sequence from a memory; creating 203 a Petri net as a function of the read-out desired communication sequence by means of a processor; and comparing 205 the communication sequence to the created Petri net by means of the processor in order to analyze the communication sequence.

The method 200 can be realized by means of the analysis device 100 shown in FIG. 1, by means of a computer, by means of a data processor, by means of a laptop, by means of a smartphone or by means of a tablet.

The communication sequence can comprise data packets exchanged between communication nodes such as computers, field devices or control devices in a communications network, whereby the data packets can comprise messages exchanged between the communication nodes. The data packets are for example captured by a network tap.

The communications network can be a process field network (PROFINET), an Industrial Ethernet network, an Ethernet network, particularly a real-time-capable Ethernet network, a local area network (LAN), a wireless local area network (WLAN), the internet or a telephone network.

The desired communication sequence can be prestored in the memory 101 in the form of a textual sequence. The textual sequence can comprise expected messages exchanged between the communication nodes listed one below or one after another. The textual sequence can further comprise fragments such as loops or alternatives, whereby the desired communication sequence can describe a dynamic communication sequence.

The communication sequence and/or the desired communication sequence can be transformed, in particular by means of a definitions library prestored in the memory 101, into an internal sequence diagram such as a sequence model. Individual messages and/or fragments can thereby be linked together sequentially. The sequence diagram can be a diagram according to the Unified Modeling Language (UML) sequence diagram (SD) standard, a diagram according to the ITU-T Message Sequence Chart (MSC) standard of the International Telecommunication Union or a diagram derived from these two cited standards. According to one example, the desired communication sequence can already be stored in the memory 101 as a sequence diagram.

To create 203 the Petri net as a function of the read-out desired communication sequence, the sequence diagram can be transformed into a Petri net in such a manner that valid messages in the communications network to be analyzed are modeled by firing-capable transitions. At least one trigger event can thereby be assigned to each transition. Furthermore, a list of the messages relevant to the analysis of the communication sequence can be compiled. Transforming sequence diagrams into Petri nets is described for example in the Ribeiro, Ó. R. and Fernandes, J. M. publication: "Some Rules to Transform Sequence Diagrams into Coloured Petri Nets," 7th Workshop and Tutorial on Practical Use of Coloured Petri Nets and the CPN Tools (CPN 2006), Aarhus, Denmark, October, 2006, the content of which is incorporated herein by reference.

To compare 205 the communication sequence to the created Petri net, a conformity check can be conducted. Here, a data packet contained in the communication sequence can be decoded and compared to the list of relevant data packets. If the decoded data packet is contained in the list of relevant data packets, the created Petri net can then be searched for a transition associated with the decoded data packet. If the transition can fire, the message contained in the decoded message packet can then be valid. If the transition cannot fire, the message contained in the decoded message packet can then be invalid. The conformity check can be run on all the data packets contained in the communication sequence.

Figure 3:
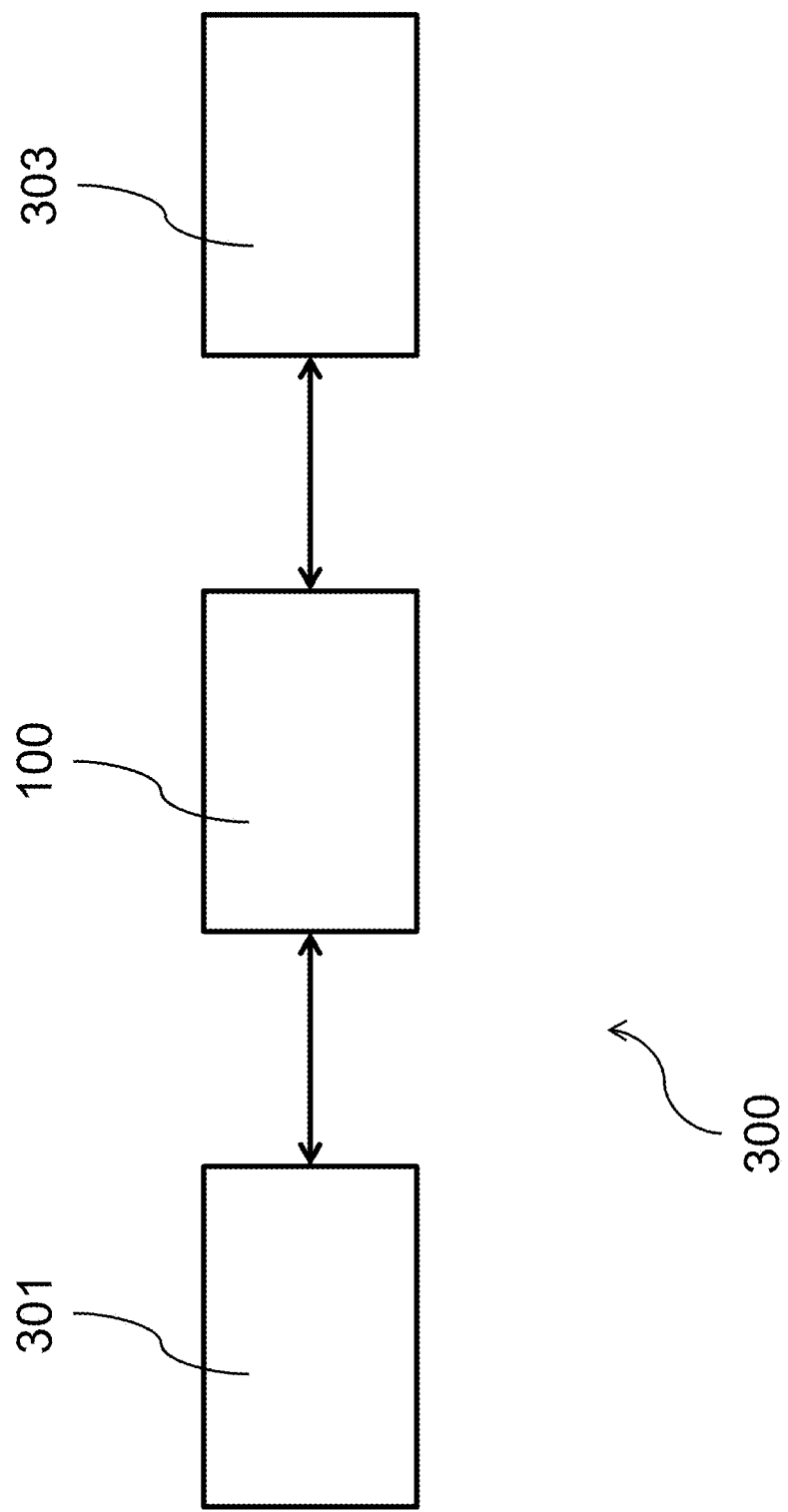
FIG. 3 is an arrangement for the analysis of a communication sequence.

FIG. 3 shows an arrangement 300 for the analysis of a communication sequence. The arrangement 300 comprises the analysis device 100, which is arranged between a first subnet 301 and a second subnet 303. In so doing, the analysis device 100, the first subnet 301 and the second subnet 303 can form the communications network. For example, the first subnet 301 comprises a PROFINET controller and the second subnet 303 a PROFINET device.

In arrangement 300, the analysis device 100 is introduced directly into the communications network. Doing so enables actively influencing, in particular by means of the modification rule, an online analysis of the communication sequence and/or a man-in-the-middle analysis or manipulation in the communications network.

Figure 4:
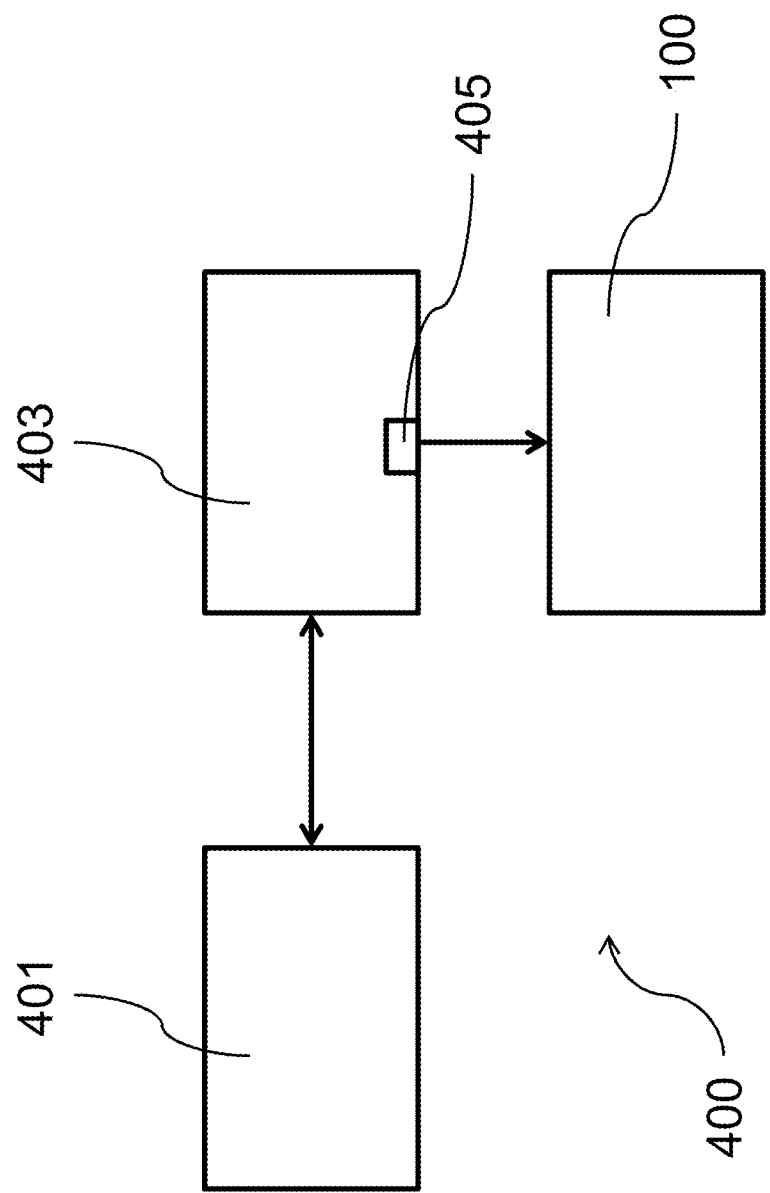
FIG. 4 is a further arrangement for the analysis of a communication sequence.

FIG. 4 shows a further arrangement 400 for the analysis of a communication sequence. The further arrangement 400 comprises a communications network 401 which is connected to a switch 403 with a mirroring port 405. The arrangement 400 further comprises the analysis device 100 connected to the mirroring port 405.

The communication nodes of the communications network 401 can thereby be connected via the switch 403 such that all the data packets exchanged between the communication nodes of the communications network 401 are transmitted via the switch 403. The switch 403 can further be configured to mirror the data packets it transmits and output them via the mirroring port 405. This thereby enables an online analysis of the communication sequence and/or a passive reading of the communication sequence by the analysis device 100.

Figure 5:
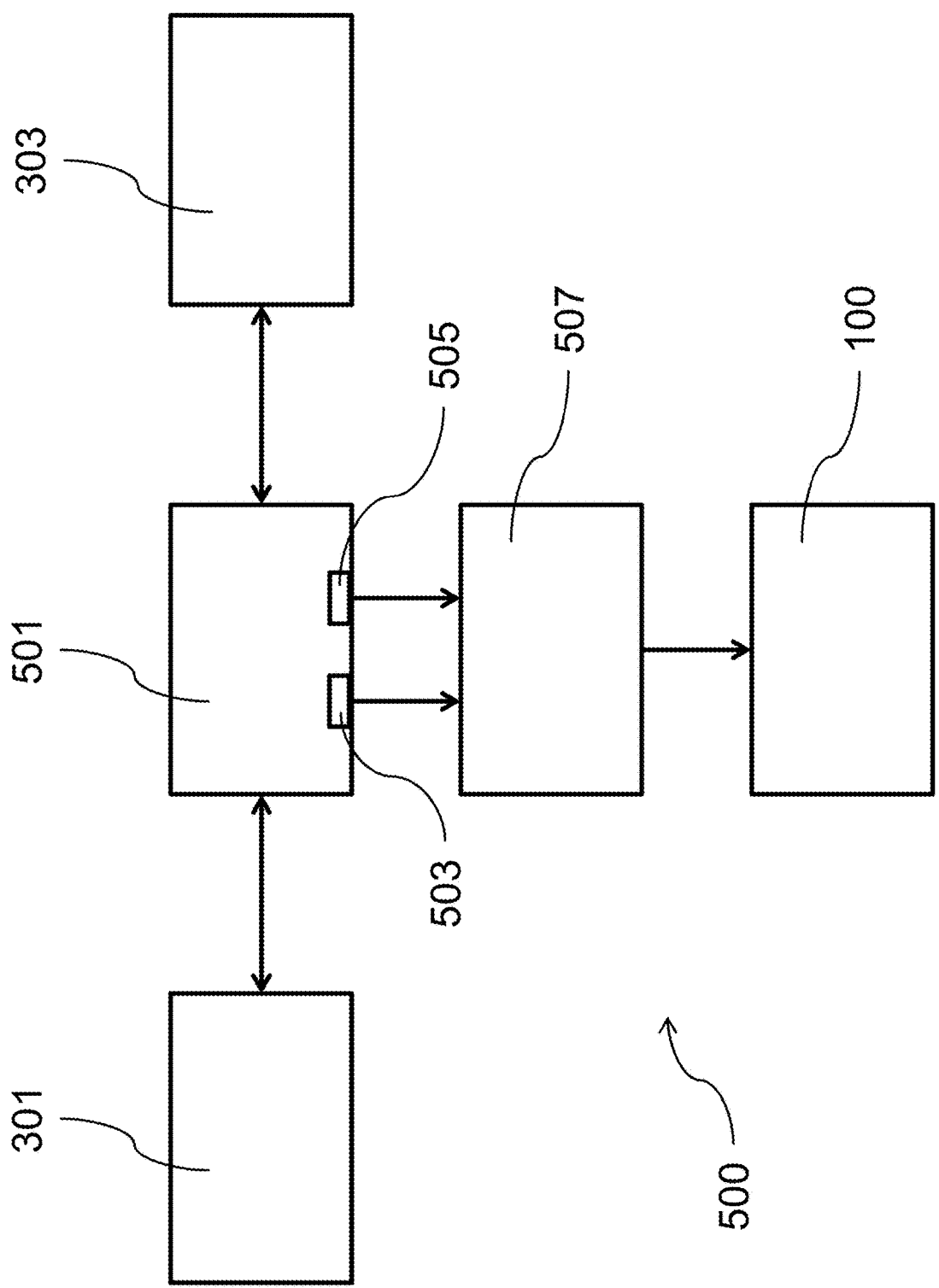
FIG. 5 is a further arrangement for the analysis of a communication sequence.

FIG. 5 shows a further arrangement 500 for the analysis of a communication sequence. The further arrangement 500 comprises the analysis device 100, the first subnet 301, the second subnet 303 and a network tap 501 arranged between the respective subnets 301, 303. The network tap 501 comprises a TX interface 503 for outputting data packets captured on a transmitter path and a RX interface 505 for outputting data packets captured on a receiver path. The arrangement 500 further comprises a merger 507 such as a device for merging connected to the TX interface 503 and the RX interface 505 which combines, in particular merges, the data packets or data received from the TX interface 503 and the RX interface 505 and transmits the same to the analysis device 100. This thereby enables an online analysis of the communication sequence and/or a passive reading of the communication sequence by the analysis device 100.

Figure 6:
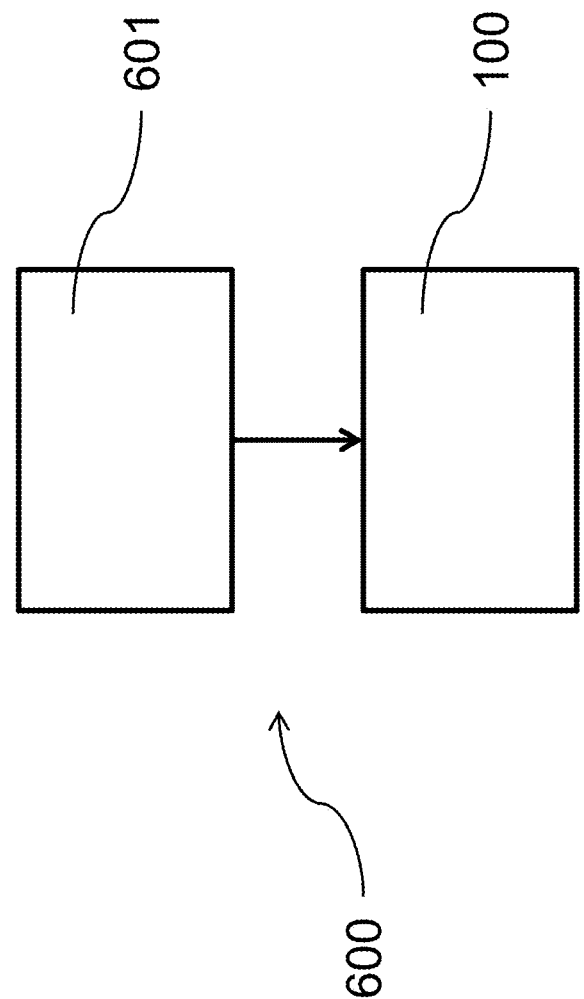
FIG. 6 is a further arrangement for the analysis of a communication sequence.

FIG. 6 shows a further arrangement 600 for the analysis of a communication sequence. The further arrangement 600 comprises a further memory 601 and the analysis device 100. The communication sequence can be stored in the further memory 601, for example in the form of a PCAP file or a PCAP recording, and relayed to the analysis device 100. For example, the communication sequence is copied from the further memory 601 into the memory 101 of the analysis device 100. This thereby enables an online analysis of the communication sequence and/or a passive reading of the communication sequence by the analysis device 100.

Figure 7:
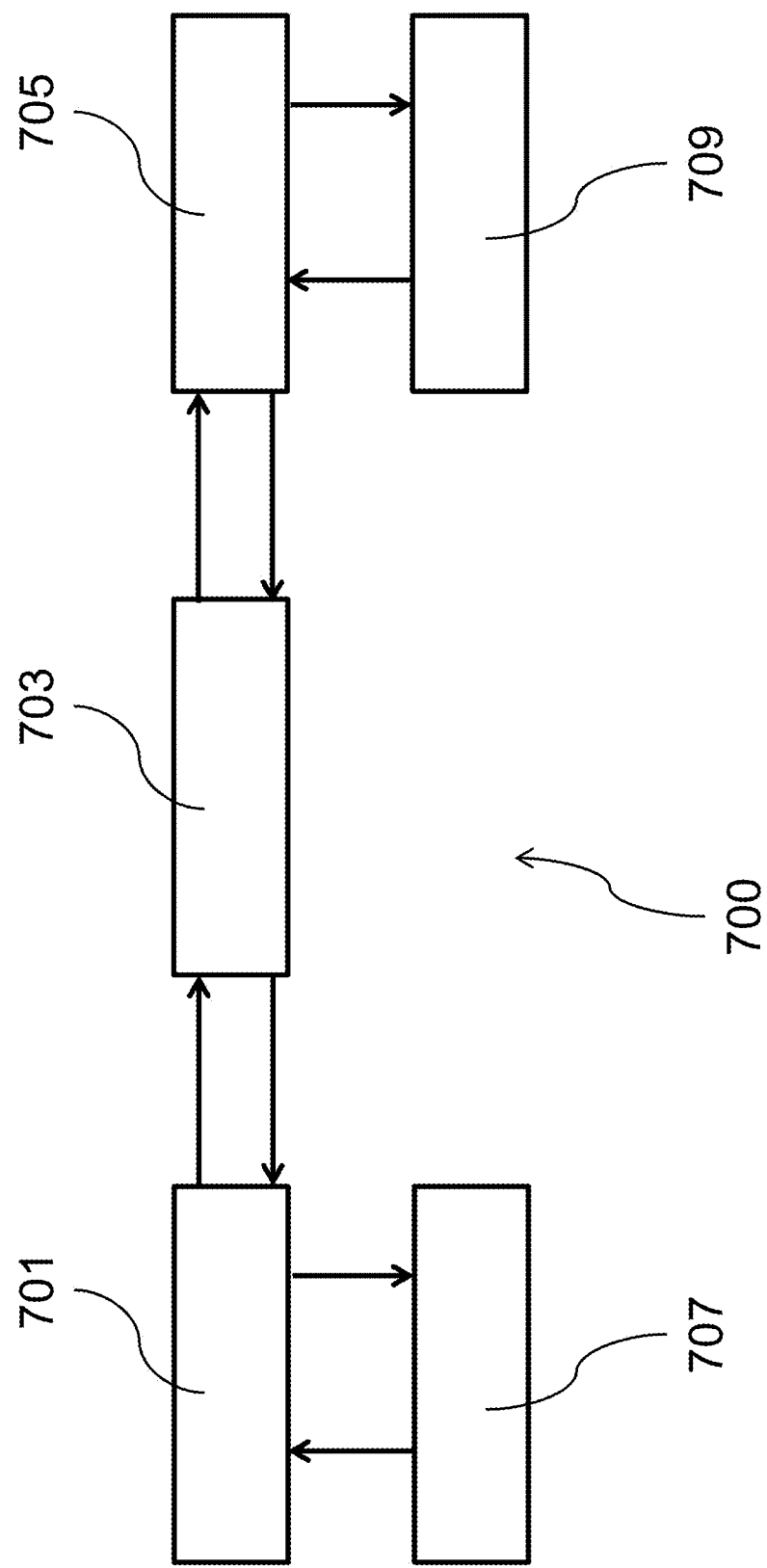
FIG. 7 is a schematic diagram for data processing in the analysis device.

FIG. 7 shows a schematic diagram 700 for data processing in the analysis device 100. The arrangement 700 comprises the respective data processing modules 701 to 709.

A decoding of a data packet can be performed in the first data processing module 701 in order to obtain a message and/or an encoding of a message can be performed in order to obtain a data packet. Furthermore, a processing can be performed in the second data processing module 703 in order to convert a message into an event and/or an event into a message. A conformity check can furthermore be run in the third data processing module 705. Furthermore, the fourth data processing module 707 can comprise a data interface via which data packets can be exchanged with the first data processing module 701. To that end, the fourth data processing module 707 can comprise a communication interface such as a network card or a plurality of network cards, and/or the memory 101 having a data packet log. The fifth data processing module 709 can comprise a user interface for parameterization and checking of the conformity check in the third data processing module 705 by a user.

The analysis device 100 can encompass the respective data processing modules 701 to 709 for analyzing a communication sequence in a PROFINET network. This depends on the network data to be analyzed as converted between different forms of representation. At the lowest level, PCAP provides a uniform interface to the raw network data. Irrespective of whether originating from a log or a network card, it can be read as a byte stream. When decoding, it can be necessary to allow for all the protocol specifications which are applicable to the communication to be monitored. According to the OSI model, the data packets can be decoded layer by layer, for example pursuant to ITU-T Recommendation X.200. For the networks under consideration, the Ethernet protocol is on lowest level. The next higher layer can be identified via an ID or heuristic. In the case of PROFINET, this includes, inter alia, IP, UDP and RPC. At the highest level is lastly a PROFINET layer—either for cyclic or acyclic data. In addition, however, other packets without PROFINET layer can also be relevant, for example data packets with ARP protocol for IP assignment. Lastly, decoding and coding is implemented for all relevant protocols. In the case of a fragmentation, one message is divided among multiple data packets. These are collected and compiled into one complete decoded message. The conformity check, which comprises a model of the network desired behavior, is at the highest level. It can be created automatically from the user's specifications prior to starting the diagnostic. In order to keep this diagnostic module and the desired behavior description as protocol-independent as possible, only abstract events are used at this level. A processing between these levels ensures that raw data packets can be converted to messages and ultimately interpreted as events. The abstraction of the data representations can thereby increase and the complexity of the data representations decrease.

When the analysis device 100 such as a diagnostic device is introduced directly into the bus, there is also a reverse channel: Events are re-coded back into messages and ultimately into data packets. Apart from a simple forwarding, individual parameters can also be manipulated. Parameters dependent thereon such as checksums and fill bytes are then adjusted during coding.

Figure 8:
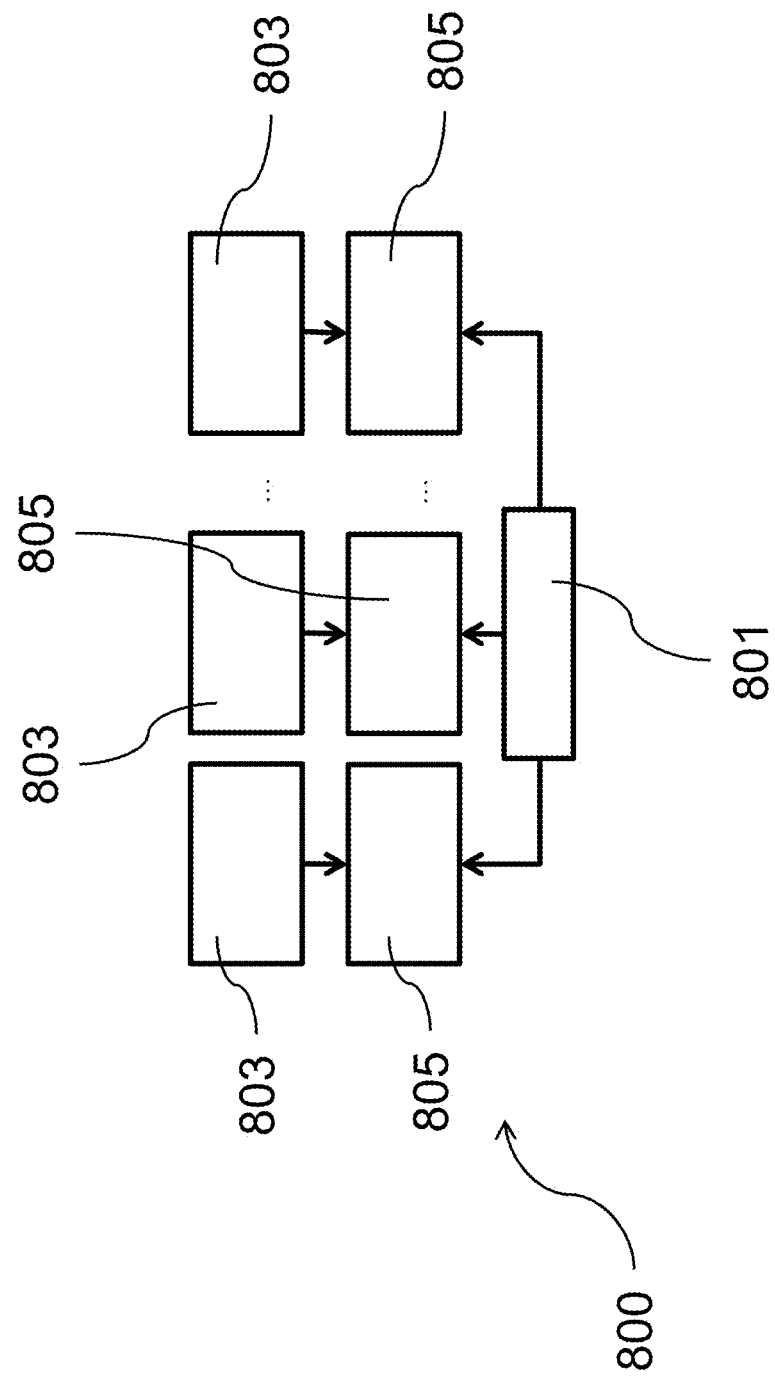
FIG. 8 is a schematic diagram for the comparing of a communication sequence to a desired communication sequence.

FIG. 8 shows a schematic diagram 800 of the comparison of a communication sequence 801 to a desired communication sequence 803. The diagram 800 depicts a plurality of desired communication sequences 803, each representing a respective desired behavior. The plurality of sequence models 805 is furthermore depicted, whereby one respective desired communication sequence 803 can be transformed into one respective sequence model 805. Furthermore, communication sequence 801 with sequence models 805 can be tested against mutually independent specialized desired behavior. The communication sequence 801 can include network data to that end.

The actual behavior of the analyzed communications network is compared against a desired behavior. The question is which form of modeling is most suitable. Conceivable would certainly be an individual representation which already dictates the entire system behavior for each application. This would correspond to one unit from all the relevant device and protocol specifications, e.g., directly from manuals and data sheets. Storing an entire specification in a format suitable for the comparison is obviously coupled with enormous complexity, which would only be further increased by the combination of all the relevant specifications. And sometimes product design testing needs to test functions which are not yet included in the documentation.

The complexity to a desired behavior's description is therefore firstly to be reduced. According to one example, the communications network can be tested against the entire specification. According to a further example, individual small tests can be initiated successively and the network behavior diagnosed each time. This results in separate specialized test cases or desired behavior respectively, as is depicted in FIG. 8. A desired behavior corresponds to a process description of valid events, which can be quickly created and adapted by the user.

The next question is how to implement an individual desired behavior. There are the following requirements:

simple parameterization
clearly arranged representation
display of sender/receiver message exchange
event validity verification Since simple processing by users is advantageous, a complex meta language such as XML can be avoided. Instead, a graphical or equivalent textual input method can be advantageous. Standardized representations are naturally of advantage: The tester is potentially already familiar with them and they have already been well-designed and proven and there may even be tools for their generation and processing.

A widespread standard for various types of diagrams is the Unified Modeling Language (UML). It has been standardized by the ISO as well as the Object Management Group, see for example Rupp, C.; Queins, S.; Zengler, B.: "UML 2 glasklar", Carl Hanser Verlag, Munich/Vienna, 2007. One advantage is being able to create different diagrams for a problem and link them together. The UML first defines structural and behavioral diagrams. A network behavior can be depicted as a chronological process description of events. Behavior diagrams are therefore particularly well-suited; the activity, sequence and communication diagram in particular. The diagram to be selected should replicate a network communication of discrete messages being sent from one communication partner to another. Senders and receivers are not explicitly depicted in an activity diagram. In contrast, this is possible in sequence and communication diagrams by means of so-called lifelines. But only in sequence diagrams (UML SDs) is there a vertical arrangement of events on a time axis. Thus, this diagram can be selected to prioritize representations of test cases as chronological successions of messages exchanged between communication partners.

The UML sequence diagram was heavily influenced by the Message Sequence Charts (MSCs). These were formulated and standardized by the ITU-T and have an equivalent textual and graphical syntax, for example pursuant to ITU-T Recommendation Z.120. For the design of the analysis device 100 such as a network diagnostic tool, it can generally be easier to import and process a textual description of desired behavior via parser than provide for an extra graphic editing component. The grammar of textual MSCs is thus then analyzed to serve the parameterization of the diagnostic tool.

There is furthermore the possibility with MSCs as well as UML SDs of context-sensitive control of the event flow via special constructs: inline expressions (MSCs) and combined fragments (UML SDs) respectively. These constructs can be nested at will. All can thereby be examined as to their utility in PROFINET-based networks and the most suitable selected for the intended implementation. Of the inline expressions, these can be the following:

Alternatives: Description of processes of which only one can occur. For example, checking whether a certain IP address has already been assigned via an ARP message. Either it has already been assigned to a device or the IP will only first be assigned after a timeout.

Options: Description of processes which can but not must occur. This can be made dependent on a Boolean condition if needed. An example is the parameterization of a PROFINET device via write messages.

Parallels: For event groups which can run independently and in any order. This includes for example establishing a PROFINET controller connection to multiple devices.

Loops: Processes occur repeatedly. Thereby it can be specified, how often this is to occur at the least and at the most. Here, too, the parameterization of a PROFINET device can be modeled via write messages.

The UML has basically adopted all the inline expressions described in the MSC standard as combined fragments. Additional fragments can, however, be introduced, of which the following for example were selected for the software implementation:

Consider: Highlight certain messages. If they do not occur within the Consider-constrained modeling but do occur in the network, then the system behavior conflicts with the modeling and is considered faulty. All other messages are implicitly ignored. This ultimately allows limiting event validity. For example, specific alarm messages can be prohibited after successfully establishing a PROFINET connection.

Ignore: Ignore certain messages—the opposite of Consider.

Lastly, MSCs as well as UML SDs offer advantages able to be utilized by both. UML SDs continue to serve as the main example, which is why their terms such as fragments are used. Additionally, a textual MSC similar in grammar can be added. It can be modified to the extent of being more transparent and more user-friendly. Its own domain-specific language (DSL) can be created to that end.

A disadvantage of textual MSC is that messages are not regarded as uniform events transmitted from a sender to a receiver. They are instead divided into sender events and receiver events. This initially results in a more complex syntax since two events need to be logged for each network message. The standard further enables logging only one of the two events. However, a message which is for example received but never sent results in a deadlock. Therefore, DSL logs a send/receive event as an inseparable unit. This also provides better modeling of a network diagnosis: Bus send/receive data packet events are thereby not independently measurable.

Figure 9B:
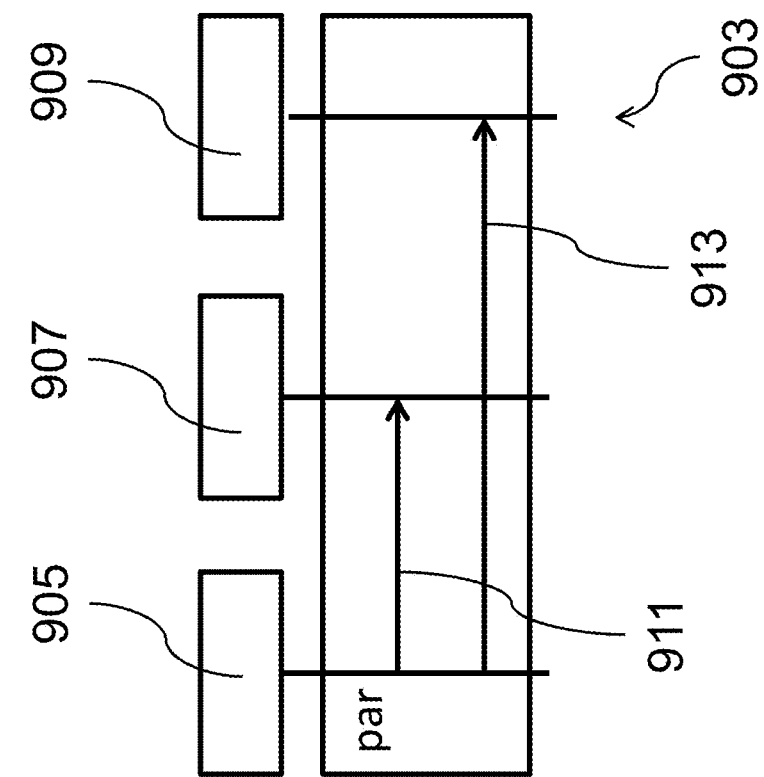
FIG. 9B is a representation of the textual sequence shown in FIG. 9A as a sequence diagram.
Figure 9A:
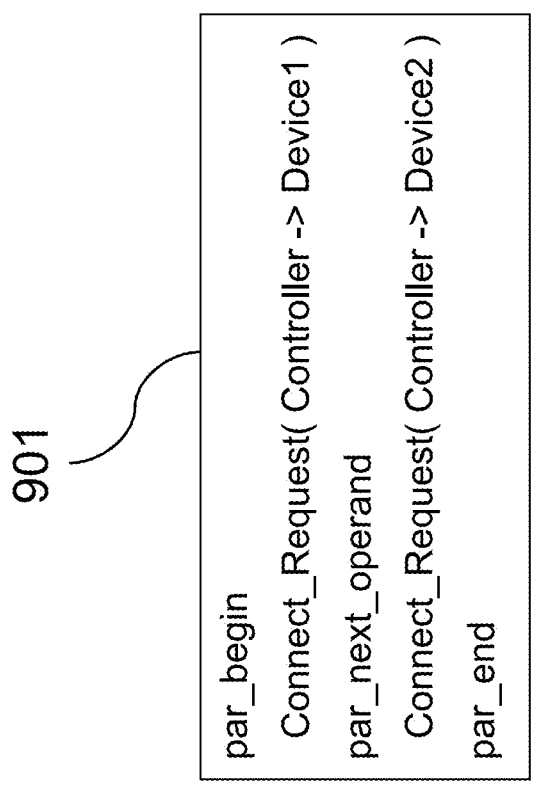
FIG. 9A is a representation of a desired communication sequence in the form of a textual sequence.

FIG. 9A shows a representation of a desired communication sequence 803 in the form of a textual sequence 901. Furthermore, FIG. 9B shows a representation of the textual sequence 901 shown in FIG. 9A as a sequence diagram 903.

The textual sequence 901 describes a test case and a simultaneous programming of the analysis device 100 with the new sequence specification language. The sequence diagram 903 displays a first "Controller" communication node 905, a second "Device 1" communication node 907 and a third "Device 2" communication node 909. Furthermore, the first communication node 905 sends a first "Connect Request" message 911 to the second communication node 907 and a second "Connect Request" message 913 to the third communication node 909. The first communication node 905 can thereby establish the connection to the second communication node 907 and the third communication node 909 in any order.

The DSL can be divided into two realms: One allows the user to create test cases or desired behavior respectively in the form of sequences. This draws on the abstract event identifiers with their definition initially hidden. FIGS. 9A and 9B show the example of a PROFINET controller which is to send a connect request to two devices simultaneously so as to initiate the establishment of a connection. Fragments are started, closed and split into operands using keywords. Messages, respectively events per se, are specified by their identifier as well as bracketed sender and receiver identifiers. This shows the inseparability of send and receive events for the selected display format.

Figure 10:
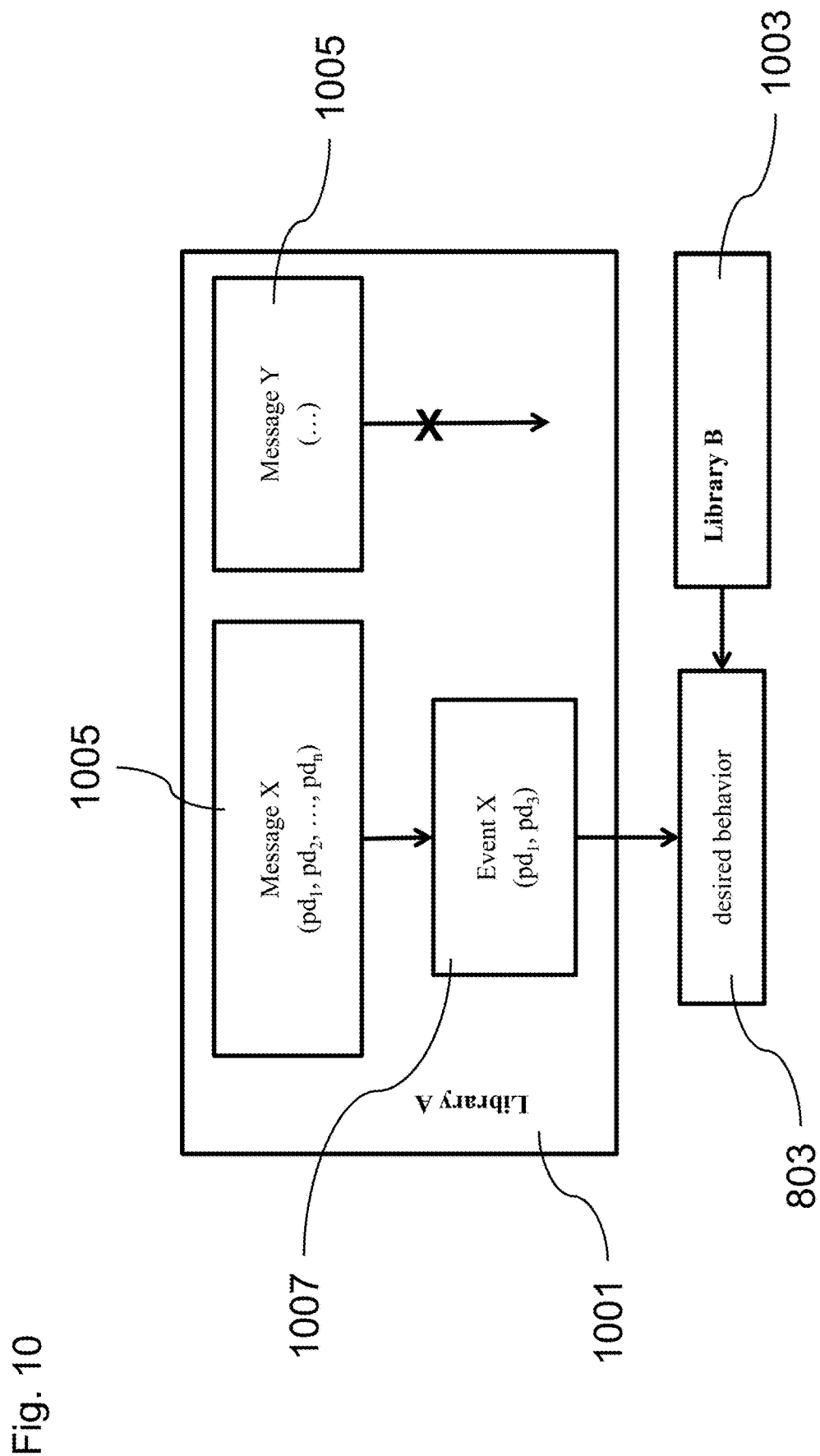
FIG. 10 is a schematic diagram for the describing of the desired communication sequence.

FIG. 10 shows a schematic diagram for the describing of the desired communication sequence 803. The desired communication sequence 803 can represent a desired behavior. The desired behavior can draw on the respective libraries 1001, 1003 in which messages 1005 and events 1007 as well as communication partners are defined. This is done by means of simple identifiers as well as pdx parameters considered relevant.

The actual definition of events, senders and receivers only occurs in the second realm: the respective libraries 1001, 1003 such as definition libraries. As FIG. 10 shows, any network messages, and also participating communication partners, can be defined therein by the relevant parameters. For example, the indication of the MAC address from the Ethernet layer is sufficient to reliably identify the controller and the devices. A PROFINET message such as a connect request can already be specified by the packet type and operation number in the DCERPC or PROFINET IO layer. The abstraction of complex messages into simple events ensues from this defining to the most necessary parameters. Focusing on only the messages required for a test case is likewise possible. Most of the message definitions only need to be established once and can then be arbitrarily utilized by desired behavior. Only the desired behavior are to be recreated and/or readapted for each test case.

Figure 11B:
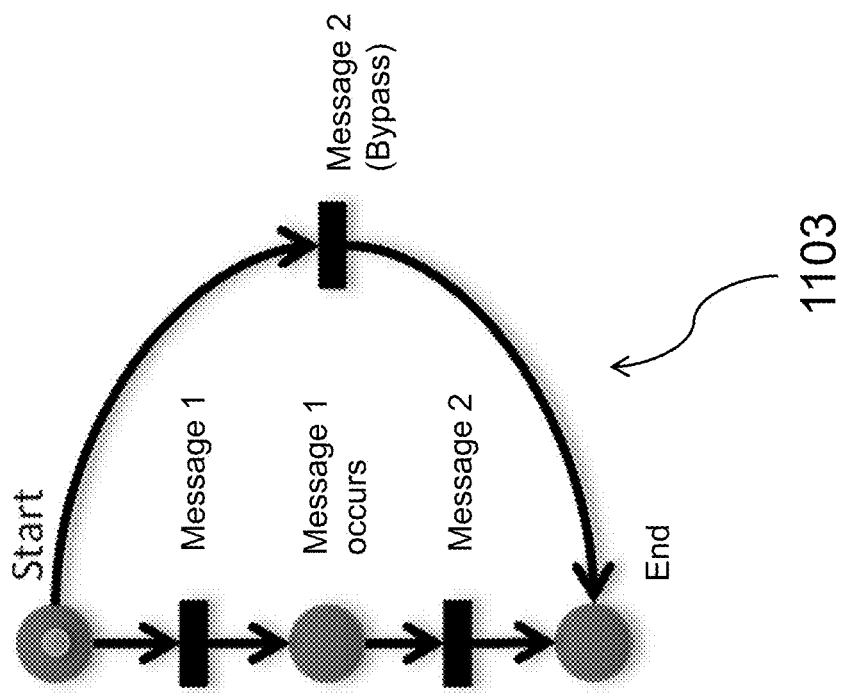
FIG. 11B is a Petri net assigned to the sequence diagram shown in FIG. 11A.
Figure 11A:
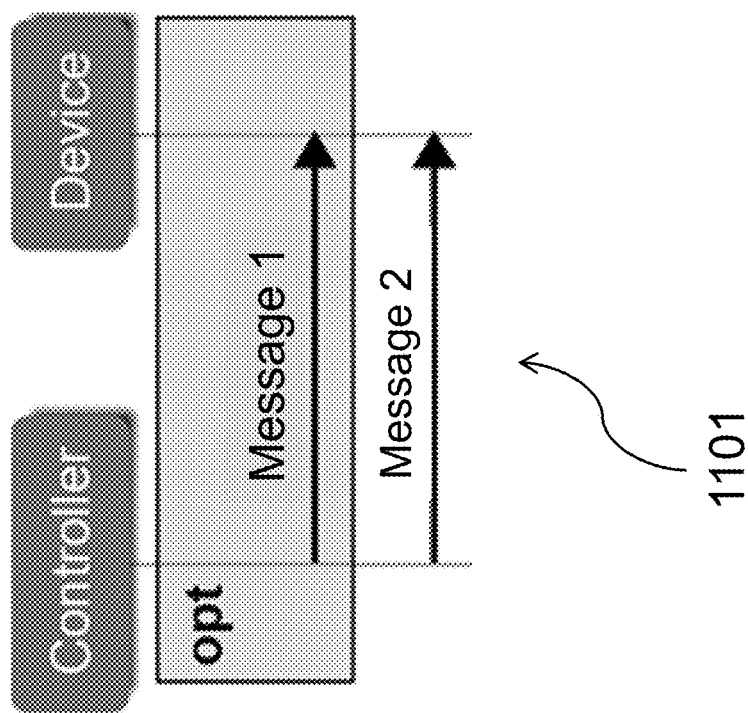
FIG. 11A is a sequence diagram.

FIG. 11A shows a sequence diagram 1101 and FIG. 11B shows a Petri net 1103 assigned to the sequence diagram 1101 shown in FIG. 11A. The Petri net 1103 here exhibits a transformed option fragment.

The diagnostic receives a sequential event stream from an actual network or a recording, from which each event can be regarded separately and is to be validated. However, only in the simplest case is a desired behavior a sequential succession of events. With fragments such as alternatives and parallels, multiple events are sometimes concurrently valid. If this includes an actual event, the system behavior is then also considered valid. The difficulty lies in finding all the valid events in the desired behavior at a specific point in time and updating this list after an actual event occurs. This can happen very quickly in order to be able to meet the real-time requirements of protocols such as PROFINET. A clearly defined notation is ultimately necessary in order to be able to store the current state. However, sequence diagrams only serve the formal definition of all valid processes. None of the considered standards provide for updating with actual occurring events.

One possibility would be marking the occurred events graphically as well as in the internal data model. Additional paths able to be run can be writable for a valid events search. In a first approach, the desired behavior is converted into an XML structure and processed nodes marked. By the feasibility of fragment nesting and loops in sequence diagrams, however, the search paths to the next valid event nodes can be long and complicated.

Furthermore, these search paths can be depicted in a tree structure or respectively in rooted graphs: Starting from one state, events can lead back to the same state or to new states. There are standardized representational forms for this as well. The simplest is a condition/event net, see for example Priese, L.; Wimmel, H.: "Petri Netze," 2nd Ed., Springer, Berlin, 2008. These graphs allow a better modeling of the network as a distributed system. In addition, they offer better simulation and analysis possibilities, e.g., with the deadlock search. Distributed states can be stored by way of the tokens. For most people, however, condition/event nets are more confusing than for example sequence diagrams 1101. Therefore, it can be advantageous to use sequence diagrams 1101 for the formal description of behavior prior to a diagnostic and employ it as a clear-cut interface between user and tool. Rooted graphs, on the other hand, can be used as internal models during the diagnostic. An automatic model transformation can be run thereto prior to diagnostic start.

To that end, an automatic model generation was devised which transforms user sequence models into internal, special graph networks. In concrete terms, this refers to adapted Petri nets 1103 consisting of places and transitions. Apart from validating, firing transitions can trigger actions. Thus, a diagnostic device such as analysis device 100 provided in the bus enables messages to be manipulated prior to forwarding.

The transforming of sequence diagrams 1101 into Petri nets 1103 is described in the Ribeiro, Ó. R. and Fernandes, J. M. publication: "Some Rules to Transform Sequence Diagrams into Coloured Petri Nets," 7th Workshop and Tutorial on Practical Use of Coloured Petri Nets and the CPN Tools (CPN 2006), Aarhus, Denmark, October, 2006. This publication however starts from the premise that the occurrence of events is always determinable in advance, for example by Boolean condition analysis. As a result, these decisions are also modeled via transitions, e.g., the entering of a branch of an alternative. Here, however, is analyzed how a vague description can be enabled by omitting conditions. While this is still done very simply in the sequence diagram 1101, it leads to a plurality of possible paths in the Petri net 1103. Therefore, the decision on the path to take is not made a priori but rather only by means of the actual data stream of network events. New rules which form a minimum graph can be tested for transformation into a Petri net 1103: Transitions stand exclusively for possible messages on the data bus. Thus, all valid events in this state thereby originate from each place as transitions and can be immediately located. Boolean conditions are linked directly thereto and are to be analyzed additionally to the token assignment preconditions and postconditions.

One example which shows the new structure is an optional fragment. The occurrence of an event is first to be determined through the path of the graph. Thus, as of the place prior to the fragment, the event is already visible after the fragment or directly linked as a transition respectively. This is realized by a type of bypass as shown in FIG. 11B.

For the diagnosis of actual networks, one last supplementation is necessary. Formal system modelings via sequence diagrams 1101 and Petri nets 1103 usually assume that all events can be modeled. Or, they assume a data stream pre-filtered to the relevant events. However, the analysis device 100 is fed unfiltered network data. This will contain a much higher occurrence of irrelevant data than data relevant to a test case. It can initially be specified how the Petri net 1103 is to react to the irrelevant. It was previously determined to represent all valid events via transitions. Since, however, irrelevant data packets are also to be ignored and thus implicitly valid, a transition can exist for them. This is called filter transition. It is usually associated with a so-called unknown event. This is then always passed up from the processing to the diagnostic module such as a diagnostic module of the analysis device when a network message cannot be identified via the definition libraries. A filter transition is added implicitly to all pre-positions in the Petri net 1103. When firing, it takes a token from these places and immediately returns it again. Thus, by default, all undefined and thus irrelevant events are ignored and nevertheless considered valid. The generating of these special transitions is only changed via Consider or Ignore fragments.

Figure 12:
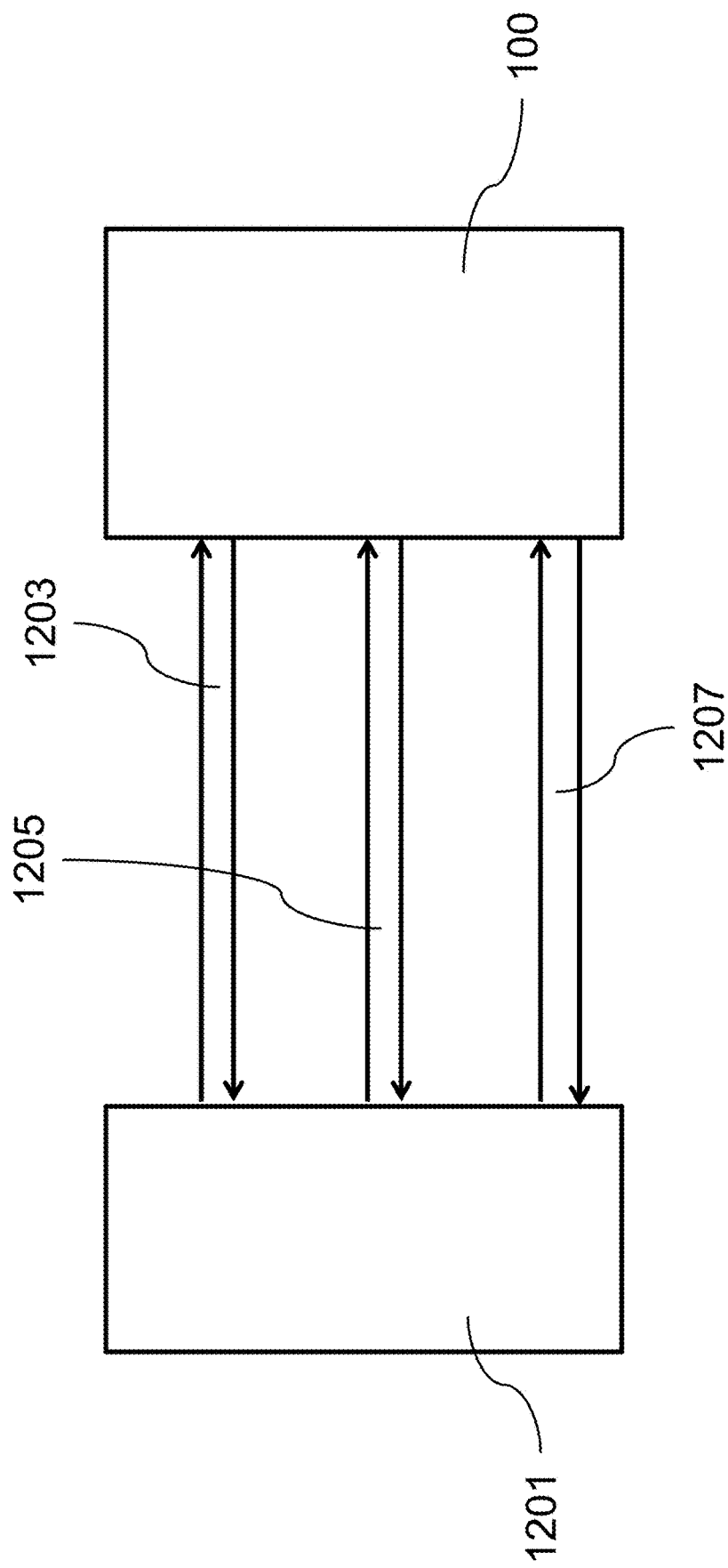
FIG. 12 is a communication flow between a control device for controlling the analysis device and the analysis device.

FIG. 12 shows a communication flow between a control device 1201 for controlling the analysis device 100 and the analysis device 100. The communication flow comprises a first "Start diagnostic" communication step 1203, a second "Diagnostic result available?" communication step 1205 and a third "Retrieve diagnostic result" communication step 1207. The control device 1201 can hereby form a diagnostic client and the analysis device 100 can form a diagnostic device as server.

The above-described mechanisms can be implemented in a software tool, same being able to be installed and run on a computer or on the analysis device 100. There are two possible applications: Firstly, the checking of network recordings in so-called offline mode. The PCAP format can be supported, which is also used by programs such as Wireshark and Tcpdump. Secondly, the checking of networks during runtime in online mode. The analysis device 100 is introduced into the network—either via a network card for diagnostics only or via two cards for diagnostics and optional manipulation. Irrespective of operating mode, the following steps can be performed in diagnostic preparation:

User devises a test case as a textual desired sequence
Integration as needed of existing libraries, e.g., definitions of PROFINET messages such as connect request
Creating and integrating as needed of new libraries or adaptation/specializing of existing ones
  Adaptation of participating communication partner MAC addresses as applicable
  New message definitions as applicable from parameters or variables
Selecting of diagnostic source: PCAP recording or one to two network cards When the user starts the diagnosis from the program interface, the following points can be processed:

An internal sequence model created from textual desired behavior
Petri net 1103 automatically created therefrom and valid event search run in start mode
Display of diagrams of both models
Checking an abstract network event in the Petri net 1103:
  Can a transition fire?
    Yes: Move token, refresh list of valid events. Online mode: Forward original uncoded message.
    No: Quit diagnostic.
Conformities and discrepancies are logged in a text log as well as graphically in a sequence diagram
Diagnostic result provided: Occurred events or differences between desired and actual graphically highlighted According to one example, the diagnostic result can be incorporated into the analysis report.

A diagnostic can remain active until quit by the user or a desired behavior is executed and/or transgressed. If the recording was entirely processed in the offline mode, it is then likewise considered terminated. If in this case not all the modeled mandatory events are found, the diagnosis is considered faulty. For the current test case, the diagnostic result is logged and, if necessary, the next test case initiated. In order to automate this process, a further remote control application can be utilized. This is a simple client such as control device 1201 which connects to the main application via TCP, initiates the diagnostic there and queries the diagnostic status and the result as applicable. This is depicted in FIG. 12. Commands and responses are exchanged over the network to be diagnosed.

If the analysis device 100 was integrated directly into the bus via two network cards, a protocol manipulation is also possible. Such is initiated by a corresponding control word in the desired behavior. Example implementations:

Erase for suppressing a message—it is not passed to the complementary interface
Modify (with parameter list) for changing any given parameter The placement of the control word within the sequence description enables context-sensitive network influence. An example is the suppression of a PROFINET connect request within connection establishment so as to run a check directly after the controller sends a ping.

During the transformation into the Petri net 1103, such a manipulation is interpreted as an action and appended to the respective transition. If an event assigned to the transition fulfills a precondition as well as a postcondition, the transition fires and implements the action. In the case of parameter modification, the uncoded message is not simply forwarded to the complementary interface. Instead, the respective parameter is modified in the abstract event and coded into a complete message. This is what is forwarded in place of the original. Programs such as tshark enable recording the data traffic on both network interfaces parallel to diagnosis. The unmodified message can thereby be recorded on one interface as can the modified on the other interface. The reaction of the connected network is likewise monitored here and immediately evaluated as well by the diagnostic tool. This enables test scenarios which have previously been impossible or only possible at great expenditure. Lastly, virtually any given parameter modification can be made, for example in order to simulate defective devices.

Figure 13:
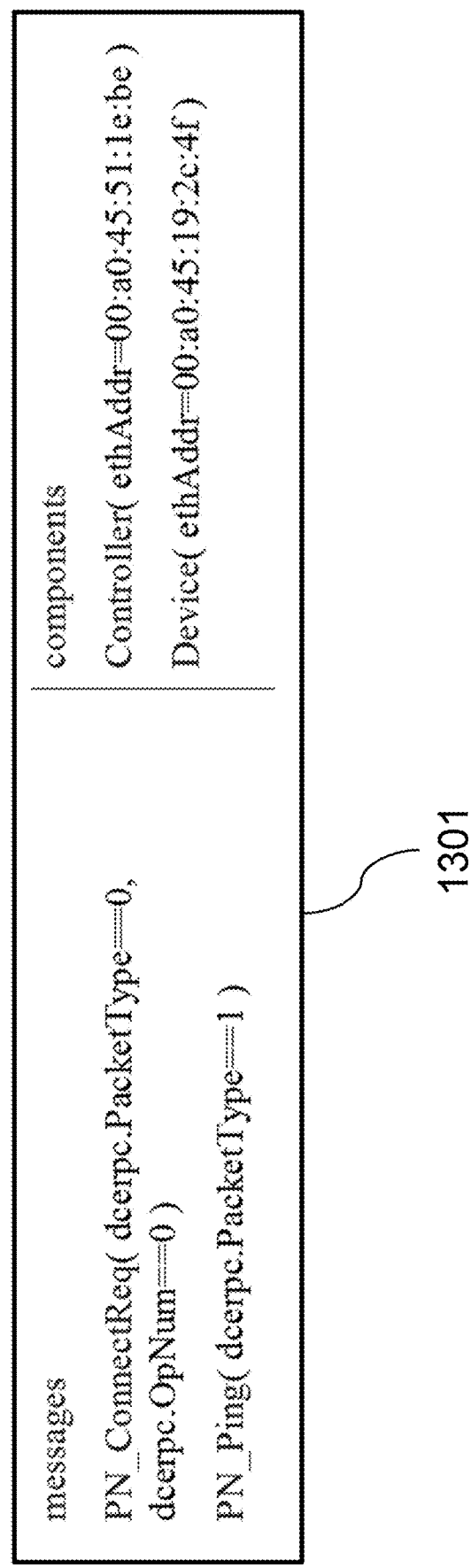
FIG. 13 is a definition for a diagnostic example.
Figures 14A, 14B:
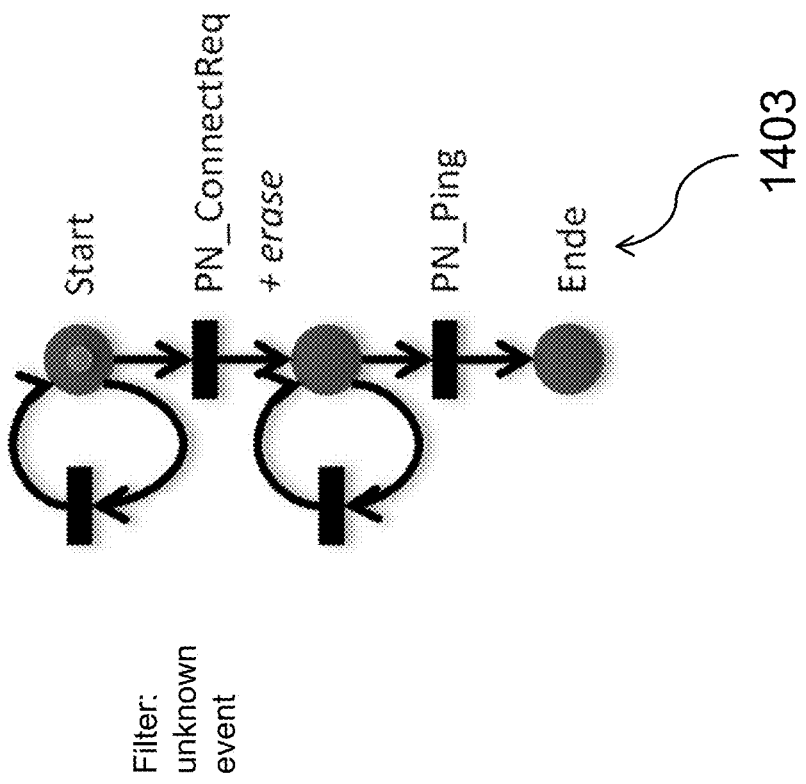
FIG. 14A is a modification rule for the diagnostic example shown in FIG. 13.
FIG. 14B is an automatically generated further Petri net for the modification rule shown in FIG. 14A.

FIG. 13 shows a definition 1301 for a diagnostic example. FIG. 14A further shows a modification rule 1401 for the diagnostic example shown in FIG. 13 and FIG. 14B shows an automatically generated further Petri net 1403 for the modification rule 1401 shown in FIG. 14A. The modification rule 1401 can hereby represent a desired behavior for the diagnostic example.

The diagnostic sequence is demonstrated using the previously mentioned case of suppressing a connect request and analyzing the subsequent ping. The parameterization begins with a check of whether a suitable PROFINET library exists. At least the connect request and ping messages can be defined therein. Identifiers which provide the decoding module thereby serve as parameters. The controller and device MAC addresses for the network to be tested are notated either in the same definition file or, for better modularization, in a further definition file. A keyword serves as parameter, same only drawing on the actually required decoding module parameter identifiers when the desired behavior role is specified as sender or receiver. The results are seen in FIG. 13.

Secondly, the test case is constructed as a desired sequence. Initially, the above-cited definitions are integrated. Among them, the connect request is notated as an expected message and thus a mandatory event. The following erase keyword indicates that upon detecting the connect request, it is not to be forwarded to the complementary interface. Since the device does not receive this message, it will not respond with a connect request. The controller will send a ping to test the device's availability. To verify this desired behavior, the ping is also notated next as an expected event. The result is depicted in FIG. 14A.

When the user starts the diagnostic, the test case is first transformed into an internal sequence and thereafter into a further Petri net 1403 as is depicted in FIG. 14B. All incoming data on a network interface is then imported via the PCAP interface, decoded and assigned to an event from the desired behavior. Unspecified messages such as, for example, a DCP Ident request are interpreted therein as unknown events and initiate the firing of only the filter transitions. A connect request from the correct controller to device, however, allows the relevant transition to fire and simultaneously triggers the erase action: The uncoded byte stream associated with the connect request is not forwarded. If a ping is now detected, particularly after an indefinite period of time, the last transition then also fires. The diagnostic module recognizes there is a token at the global endpoint, regards the diagnosis as successful and notifies the user of such.

Network-based applications can be tested as to proper function during their development. The analysis device 100 can be geared toward a tester's customary approach: Define a number of highly specialized test cases and test them individually against the actual behavior. The analysis device 100 furthermore supports the creating and controlling of such test cases via an editor and executes the tests fully automatically. Users of the analysis device 100 can intuitively store and manage their usual test procedures.

Furthermore, feasibilities of test case/independent desired behavior descriptions can be analyzed. The UML can be regarded as a widespread standard and sequence diagrams 903, 1101 as the most suitable for replicating the message transmission from a sender to a receiver on a bus. MSCs, the properties of which were likewise analyzed, are closely related. Furthermore, MSC textual grammar can be advantageous in easily preparing desired behavior to be parsed in sequential form. They can thereafter be transformed into graphic diagrams to provide a practical overview. Furthermore, additional fragments of the UML SDs can be introduced in order to be able to limit the validity of messages. As result, a domain-specific language which is based on both standards can be created.

A library concept allows the independent creation of definitions drawing on the parameters of necessary messages as well as participating components. The test cases can likewise be provided as independent sequences. They mask the protocol-specific parameters behind abstract events. The advantage is increased clarity and the expansion of the user circle.

In order to be able to determine all valid messages in runtime, events which have occurred are to be stored and thus the current state monitored. This preferably ensues by means of an internal graph model into which the sequence model can be transformed prior to diagnostic start. In practice, the Petri net 1103 can be selected. All firable transitions for valid events and/or messages in the network originate from one place. The Petri net 1103 can be extended to the effect that multiple events can be assigned to a transition and this in turn to multiple follow-up actions.

In operation on a non-real-time-capable operating system, there are initially latencies which can be quite high due to thread management and the scheduler. This can impede use in networks with short cycle times. Moreover, there is always the possibility of jitters which can impact the real-time-capability of protocols such as PROFINET. It can therefore be advantageous to implement a diagnostic software, by means of which the method 200 can be executed, on embedded systems or the controllers themselves. It can moreover be advantageous to simplify the generating of definitions based on the actual message stream. The MAC addresses of all participating devices constitute one example of this.

Lastly, the analysis device 100 provides new possibilities for simplifying Ethernet-based communication analysis and testing. It can furthermore be of advantage to simplify the diagnosis, e.g., in the form of libraries with typical problem cases. These cases can be manipulated or supplemented by the user without changing the diagnostic tool such as the analysis device 100 itself.

According to one example, the analysis device 100 can be used to compare the communication sequence 801, such as an actual Ethernet communication sequence, against the desired communication sequence 803, such as a freely programmable desired sequence, whereby a depiction of the discrepancies can be realized when the actual communication sequence 801 does not correspond to the desired communication sequence 803, e.g., the desired sequence. When they are consistent, a success message can furthermore be displayed.

According to a further example, the communication sequence 801 can be recorded offline and later compared to the desired communication sequence 803.

According to a further example, the comparison to the desired communication sequence 803 can occur during ongoing communication by the analysis device 100 monitoring the data traffic.

According to a further example, a context-sensitive manipulation of protocol sequences can be made when passing through the analysis device 100 with subsequent comparison against the desired communication sequence 803 or against the expected desired behavior.

According to a further example, the data can be recorded before and after the manipulation and storing to a file and be displayed by a network diagnosis tool or by means of the analysis device 100.

According to a further example, a graphic representation of the desired behavior can be shown in the form of UML SD diagrams, for example by means of a display element of the analysis device 100.

According to a further example, a graphic representation of the actual behavior can be shown in the form of UML SD diagrams, for example by means of a display element of the analysis device 100.

According to a further example, the differences between desired and actual behavior can be depicted in textual or graphical form.

According to a further example, libraries with a definition of recurring Ethernet network components can be used to realize the method 200.

According to a further example, libraries with a definition of specific Ethernet network messages can be used to realize the method 200.

According to a further example, libraries with a definition of desired communication sequences 803 can be used to realize the method 200.

According to a further example, the aforementioned libraries can apply a concept for the managing of components, messages and desired sequences without the details contained therein on a user, e.g., the analysis device, being known. This enables know-how protection to be achieved.

According to a further example, the method 200 can be realized by means of a computer program product such as a software.

According to a further example, the computer program product can run on a computer having two network interfaces for online analysis and manipulation.

According to a further example, the computer program product can run on a computer having one network interface for online analysis.

According to a further example, recorded protocol sequences can be imported into the memory 101 of the analysis device 100.

According to a further example, the analysis device 100 can be remotely controlled for the purpose of test automation or for monitoring from a control console.

According to a further example, the sequence descriptions can be integrated into the memory 101 of the analysis device 100 from an online platform.

According to a further example, the analysis device 100 can be integrated in a control system.

According to a further example, the analysis device 100 can be integrated in a field device.

All of the features described and shown in connection with individual examples of the disclosure can be provided in different combinations in the inventive subject matter so as to realize their advantageous effects simultaneously.

LIST OF REFERENCE NUMBERS 100 analysis device
101 memory
103 processor
200 method
201 reading out
203 creating
205 comparing
300 arrangement
301 first subnet
303 second subnet
400 further arrangement
401 communications network
403 switch
405 mirroring port
500 further arrangement
501 network tap
503 Tx interface
505 Rx interface
507 merger
600 further arrangement
601 further memory
700 diagram
701 first data processing module
703 second data processing module
705 third data processing module
707 fourth data processing module
709 fifth data processing module
800 diagram
801 communication sequence
803 desired communication sequence
805 sequence model
901 textual sequence
903 sequence diagram
905 first communication node
907 second communication node
909 third communication node
911 first message
913 second message
1001 first library
1003 second library
1005 message
1007 event
1101 sequence diagram
1103 Petri net
1201 control device
1203 first communication step
1205 second communication step
1207 third communication step
1301 definition
1401 modification rule
1403 further Petri net

What is claimed is:

1. An analysis device configured to analyze a communication sequence, comprising:
a communication interface configured to:
capture data packets transmitted in a communications network; and
obtain the communication sequence based at least in part on the captured data packets;
a memory configured to store a desired communication sequence and a modification rule; and
a processor configured to:
read out the desired communication sequence from the memory;
create a Petri net as a function of the read-out desired communication sequence;
compare the communication sequence to the created Petri net;
analyze the communication sequence based on the comparison;
read out the modification rule from the memory;
decode a captured data packet;
convert a result of the decoding into an event;
check whether the result of the decoding can be assigned to a transition in the Petri net; and
modify the captured data packet by the communication interface as a function of the modification rule, the analysis, and the checking to obtain a modified communication sequence;
wherein the analysis device is arranged between a first subnet and a second subnet of a communication network.

2. The analysis device according to claim 1, wherein the processor is further configured to:
check the communication sequence for conformity to the created Petri net; and
compare the communication sequence to the created Petri net.

3. The analysis device according to claim 1, wherein the desired communication sequence is stored in the memory in the form of a textual sequence or in the form of a sequence diagram.

4. The analysis device according to claim 1, wherein the processor is further configured to implement:
an editor for creating the desired communication sequence.

5. The analysis device according to claim 1, wherein the processor is further configured to:
generate an analysis report based at least in part on the comparison of the communication sequence to the created Petri net.

6. The analysis device according to claim 5, further comprising:
a display element for graphically displaying the generated analysis report.

7. The analysis device according to claim 1, wherein the communication sequence is stored in the memory, and wherein the processor is configured to read out the communication sequence from the memory.

8. The analysis device according to claim 1, wherein the communication interface comprises at least one Ethernet interface.

9. The analysis device according to claim 1, wherein the communication interface is configured to output the modified data packet.

10. The analysis device according to claim 1, wherein the processor is further configured to:
compare the modified communication sequence to the created Petri net; and
generate a further analysis report based at least in part on the comparison of the modified communication sequence to the created Petri net.

11. The analysis device according to claim 10, further comprising:
a display element for graphically displaying the further generated analysis report.

12. The analysis device according to claim 1, wherein the modification rule is stored in the memory as a textual sequence or as a sequence diagram.

13. The analysis device according to claim 1, further comprising:
an editor for creating the modification rule.

14. A method for analyzing a communication sequence, comprising:
capturing transmitted data packets in a communications network via a communication interface;
obtaining the communication sequence via the communication interface;
reading out a desired communication sequence from a memory;
creating a Petri net as a function of the read-out desired communication sequence by means of a processor;
comparing the communication sequence to the created Petri net by means of the processor;
analyzing the communication sequence based on the comparison;
reading out a modification rule from the memory;
decoding a captured data packet;
converting a result of the decoding into an event;
checking whether the result of the decoding can be assigned to a transition in the Petri net; and
modifying a data packet captured by the communication interface as a function of the read-out modification rule, the analysis, and the checking to obtain a modified communication sequence;
wherein the method is performed by an analysis device that is arranged between a first subnet and a second subnet of a communication network, the analysis device comprising the processor, memory and communication interface.

15. The method according to claim 14, comprising:
outputting the modified data packet via the communication interface.

16. The method according to claim 14, further comprising:
creating the modification rule for modifying a data packet to obtain the modified communication sequence from the communication sequence.

* * * * *